(12) United States Patent
Chong et al.

(10) Patent No.: US 11,120,381 B2
(45) Date of Patent: Sep. 14, 2021

(54) PRODUCT DECLARATION VALIDATION

(71) Applicant: INTERNATIONAL BUSINESS MACHINES CORPORATION, Armonk, NY (US)

(72) Inventors: Poh Lin Chong, Singapore (SG); William J. Green, Cary, NC (US); Keh Ser Koo, Singapore (SG); Curtis T. Grosskopf, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 231 days.

(21) Appl. No.: 16/134,149

(22) Filed: Sep. 18, 2018

(65) Prior Publication Data
US 2020/0090185 A1    Mar. 19, 2020

(51) Int. Cl.
*G06Q 10/00* (2012.01)
*G06Q 10/06* (2012.01)
*G06Q 30/00* (2012.01)
*G06N 20/00* (2019.01)
*G06F 16/248* (2019.01)

(52) U.S. Cl.
CPC ....... *G06Q 10/0635* (2013.01); *G06F 16/248* (2019.01); *G06N 20/00* (2019.01); *G06Q 30/018* (2013.01)

(58) Field of Classification Search
CPC .... G06Q 10/06; G06Q 10/0631; G06Q 10/04; G06Q 10/0838; G06Q 10/087; G06Q 30/018; G06Q 30/0201; G06Q 30/0605; G06Q 30/0631; G06Q 30/0635; G06Q 50/28; G06Q 10/0635
See application file for complete search history.

(56) References Cited

U.S. PATENT DOCUMENTS

| | | | |
|---|---|---|---|
| 9,595,012 B2 | 3/2017 | Predale et al. | |
| 9,626,636 B2 | 4/2017 | Dlott et al. | |
| 2008/0154749 A1* | 6/2008 | D'hooghe | G06Q 10/087 705/28 |
| 2012/0123953 A1* | 5/2012 | Jabara | G06Q 30/018 705/317 |
| 2014/0058534 A1* | 2/2014 | Tiwari | G05B 13/04 700/9 |

(Continued)

OTHER PUBLICATIONS

Lithner, D., Larsson, A., & Dave, G. (2011). Environmental and health hazard ranking and assessment of plastic polymers based on chemical composition. Science of the Total Environment, 409(18), 3309-3324. (Year: 2011).*

*Primary Examiner* — William S Brockington, III
(74) *Attorney, Agent, or Firm* — Cantor Colburn LLP; Tihon Poltavets

(57) ABSTRACT

Systems and methods for product declaration validation are provided. Aspects include receiving, by a processor, component data for a component. Obtaining, by the processor, environmental compliance data. Obtaining, by the processor, historical component data associated with the component. Determining a risk score for the component based on a feature vector, generated by a machine learning model, comprising a plurality of features extracted from the component data, environmental compliance data, and the historical component data and presenting the risk score for the component to a user.

20 Claims, 5 Drawing Sheets

(56) References Cited

U.S. PATENT DOCUMENTS

| | | | |
|---|---|---|---|
| 2014/0250149 A1* | 9/2014 | Hamada | G06F 16/2465 |
| | | | 707/776 |
| 2017/0178146 A1 | 6/2017 | Mayer | |
| 2017/0200006 A1* | 7/2017 | Gershoni | G06Q 10/06 |
| 2017/0308640 A1* | 10/2017 | Brelje | G06F 30/15 |
| 2018/0152471 A1* | 5/2018 | Jakobsson | H04L 63/1433 |
| 2019/0171774 A1* | 6/2019 | Andrews | G06Q 30/0201 |

* cited by examiner

PRODUCT DECLARATION VALIDATION

BACKGROUND

The present invention generally relates to environmental product declaration, and more specifically, to a tool for product declaration validation for environmental compliance.

Environmental laws and regulations are regularly under review and are updated to protect human health and the environment. To manage environmental compliance for parts and products becomes challenging as these environmental laws and regulations are updated and/or changed, especially across jurisdictions. For example, environmental laws and regulations in the European Union may be different than environmental laws and regulations across North America. In addition, multinational corporations can implement environmental guidelines that can be updated regularly to either comply with laws and regulations and/or to set a corporate standard in an industry. With the increasing complexity of global multi-tier supply chain structures, the challenges of compliance with laws, regulations, and/or corporate policies will increase.

SUMMARY

Embodiments of the present invention are directed to a computer-implemented method for product declaration validation. A non-limiting example of the computer-implemented method includes receiving, by a processor, component data for a component. Obtaining, by the processor, environmental compliance data. Obtaining, by the processor, historical component data associated with the component. Determining a risk score for the component based on a feature vector, generated by a machine learning model, comprising a plurality of features extracted from the component data, environmental compliance data, and the historical component data and presenting the risk score for the component to a user.

Embodiments of the present invention are directed to a system for product declaration validation. A non-limiting example of the system includes a processor communicatively coupled to a memory, the processor configured to receive component data for a component, obtain environmental compliance data, obtain historical component data associated with the component, determine a risk score for the component based on a feature vector, generated by a machine learning model, comprising a plurality of features extracted from the component data, environmental compliance data, and the historical component data, and present the risk score for the component to a user.

Embodiments of the invention are directed to a computer program product for product declaration validation, the computer program product comprising a computer readable storage medium having program instructions embodied therewith. The program instructions are executable by a processor to cause the processor to perform a method. A non-limiting example of the method includes receiving, by a processor, component data for a component. Obtaining, by the processor, environmental compliance data. Obtaining, by the processor, historical component data associated with the component. Determining a risk score for the component based on a feature vector, generated by a machine learning model, comprising a plurality of features extracted from the component data, environmental compliance data, and the historical component data and presenting the risk score for the component to a user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
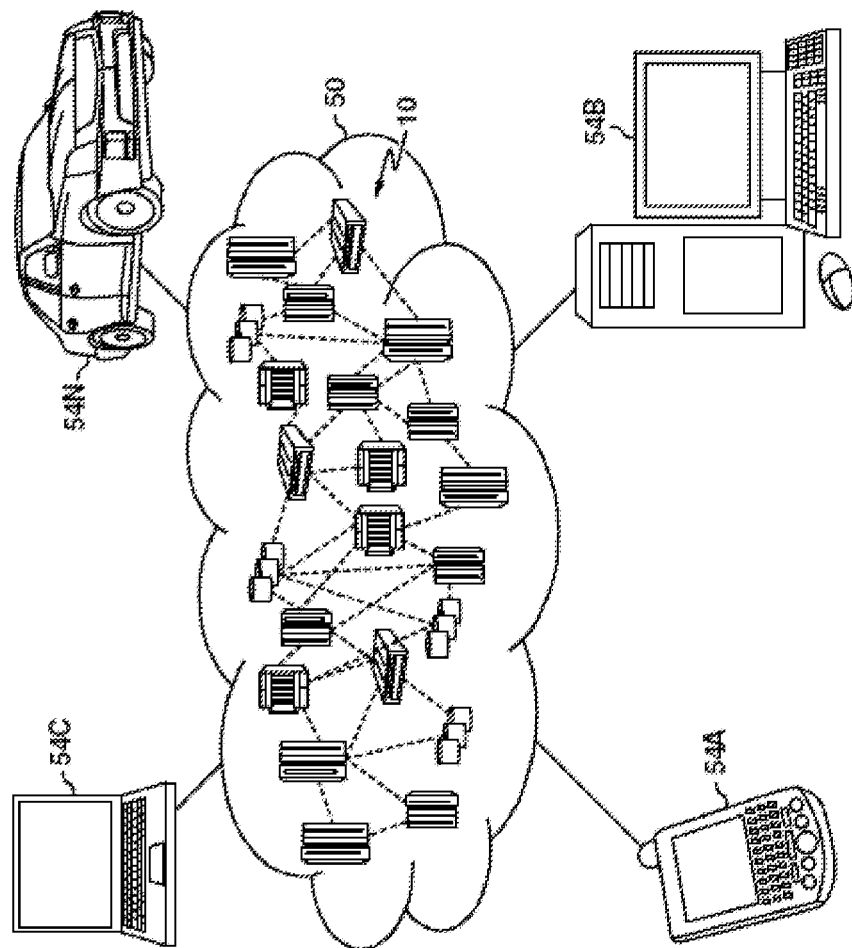
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
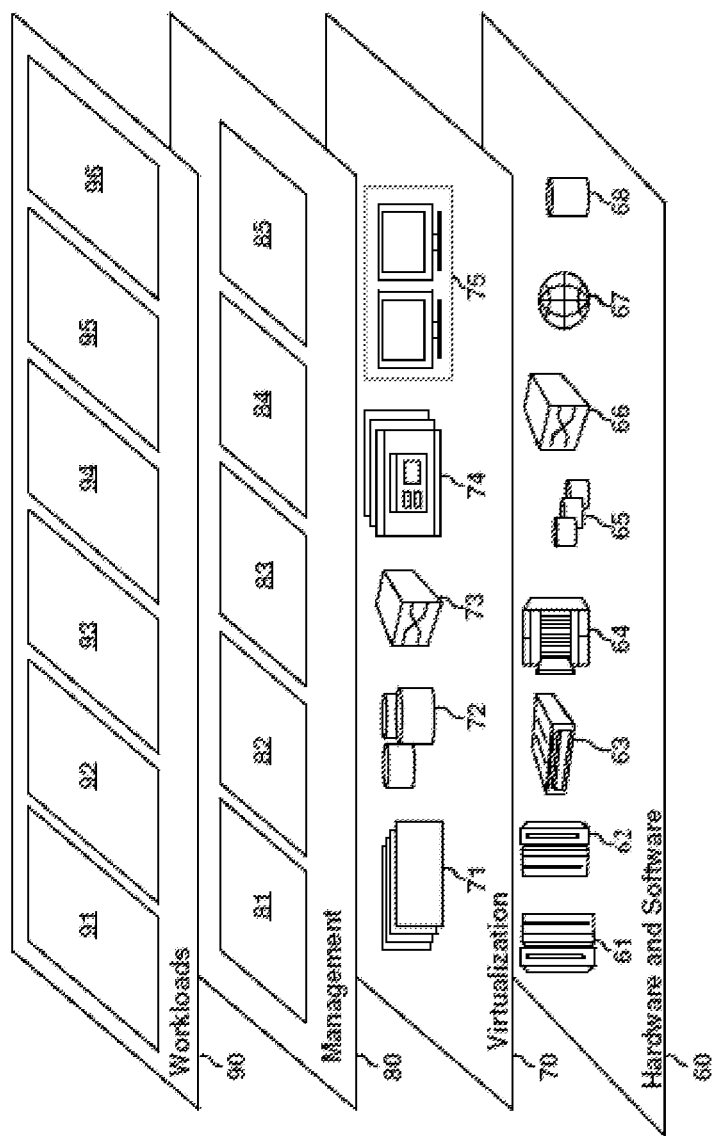
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and product declaration validation 96.

Figure 3:
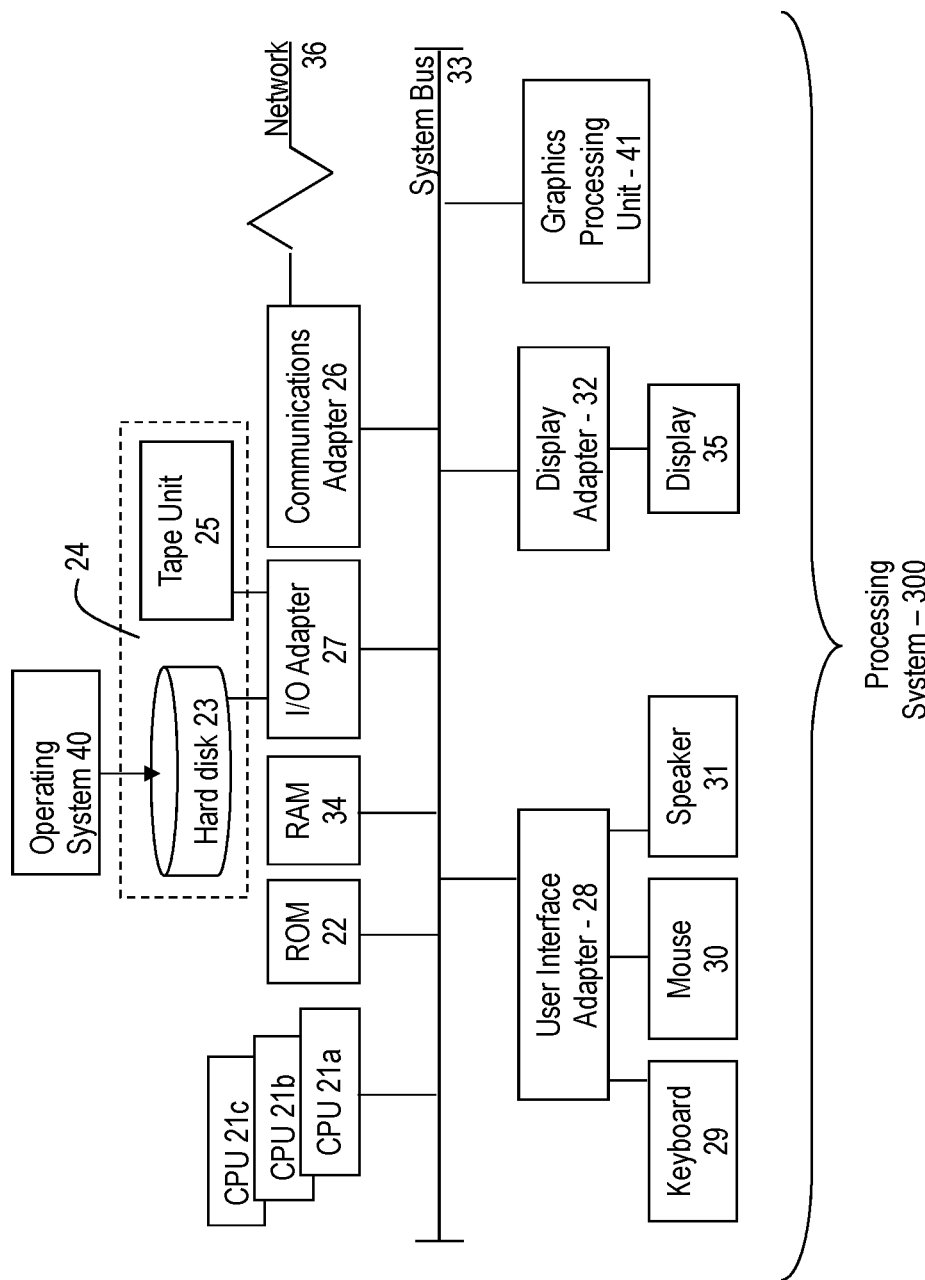
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, product declarations, sometimes referred to as product content declaration (PCD), include a standardized process of quantifying the environmental impact of a product or system. Declarations include information on the environmental impact of raw material acquisition, energy use and efficiency, the content of materials and chemical substances, emissions to air, soil, and water, and waste generation. These PCDs also include product and manufacturer/supplier information as well. PCDs establish a baseline environmental requirements for supplier deliverables to a company. Companies can set restrictions on materials in products and on certain chemicals used in manufacturing and require suppliers to disclose information about the content of certain materials in their products.

Turning now to an overview of the aspects of the invention, one or more embodiments of the invention include a product declaration validation tool that assists with managing components based on various regulatory environmental compliances of the components within a product. Aspects of the invention utilize historical part numbers and environmental information with an algorithm to compare and recommend the latest environmental information to be accepted for any new or refreshed part numbers of similar product family series. The PCD tool starts by classifying technical specifications of part numbers by identifying a unique classifier. The technical specification includes supplier names, product leads for attachment, supplier packs name, and the like. The PCD tool can then continue by classifying environment specification by identifying another unique classifier. The environmental specification includes a unique identifier of a technical specification. The PCD tool can then compare and recommend, utilizing the algorithm, whether a given part is compliant and whether there is a discrepancy between total/substance weight or substance. Further, the PCD tool can assess a risk level for each given recommendation and identify any new regulations and provide recommendations based on the new regulations and a list of non-compliant parts based on the new regulations.

Figure 4:
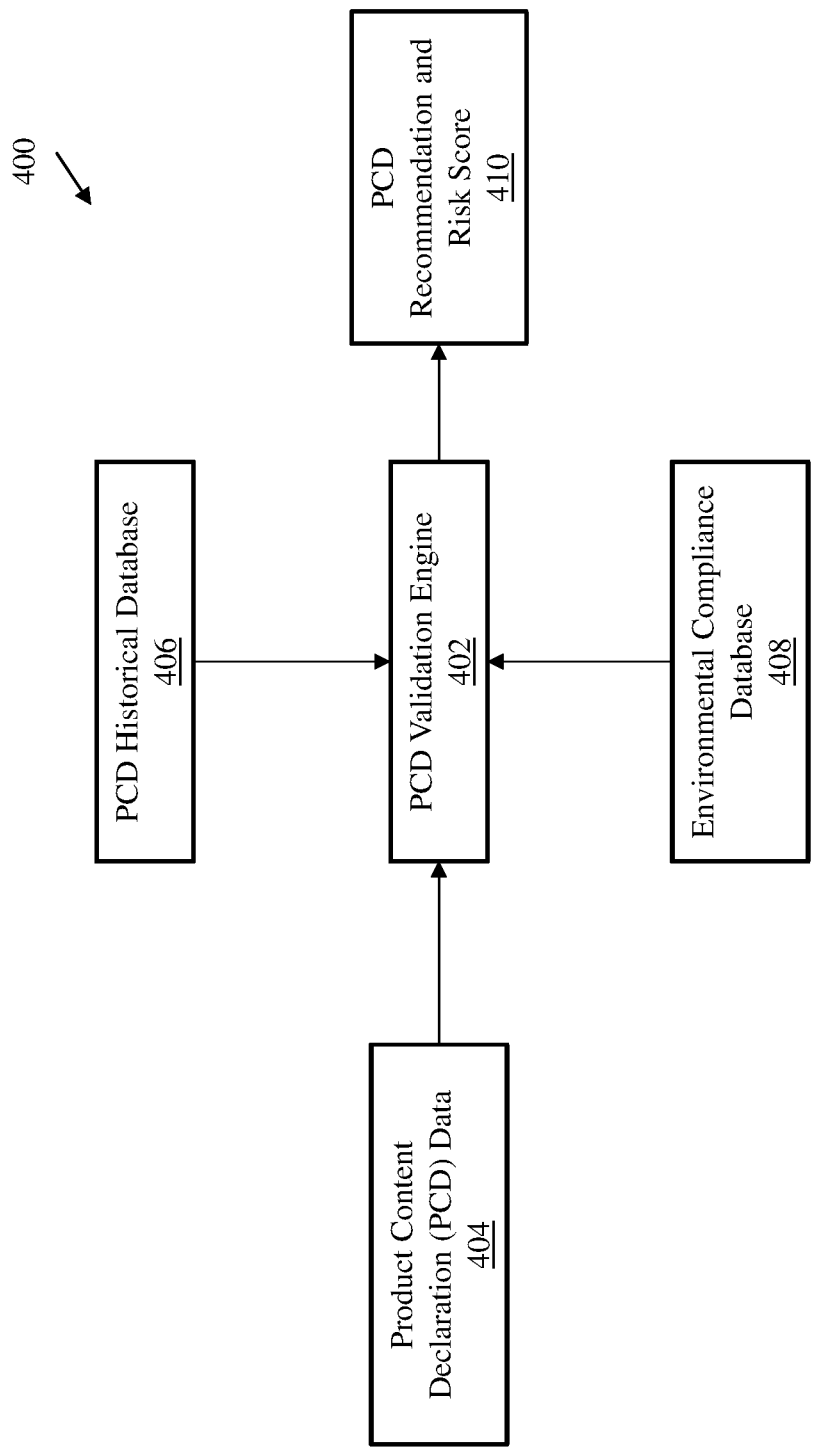
FIG. 4 depicts a block diagram of a system for product declaration validation according to one or more embodiments of the invention.

Turning now to a more detailed description of aspects of the present invention, FIG. 4 depicts a system for managing components/parts of a product by assessing a risk level for each component/part of the product based on environmental compliance data according to embodiments of the invention. The system 400 includes a PCD validation engine 402, a PCD historical database 406, and an environmental compliance database 408. The PCD validation engine 402 is configured to receive PCD data 404 for analysis and output of a recommendation and risk score 410 for the PCD based on an analysis of the PCD data 404 and historical PCD data from the PCD historical database 406 and environmental compliance data obtained from the environmental compliance database 408.

In embodiments of the invention, the engine 402 can also be implemented as so-called classifiers (described in more detail below). In one or more embodiments of the invention, the features of the various engines/classifiers (402) described herein can be implemented on the processing system 300 shown in FIG. 3, or can be implemented on a neural network (not shown). In embodiments of the invention, the features of the engines/classifiers 402 can be implemented by configuring and arranging the processing system 300 to execute machine learning (ML) algorithms. In general, ML algorithms, in effect, extract features from received data (e.g., inputs to the engines 402) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

Additionally, in embodiments of the invention, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

The PCD validation engine 402 can perform natural language processing (NLP) analysis techniques on the content of the PCD data 404, environmental compliance data, and PCD historical data. NLP is utilized to derive meaning from natural language. The PCD validation engine 402 can analyze the content of the PCD data 404, environmental compliance data, and PCD historical data by parsing, syntactical analysis, morphological analysis, and other processes including statistical modeling and statistical analysis. The type of NLP analysis can vary by language and other considerations.

In one or more embodiments of the invention, the PCD validation engine 402 can perform an NLP analysis that is utilized to generate a first set of NLP structures and/or features which can be utilized to identify certain keywords that would relate to materials that are of environmental concern based on known or extracted environmental compliance data. The environmental compliance data can be extracted from environmental rules and regulations utilizing NLP techniques to extract keywords, sentences, and other structures to determine whether certain materials utilized in products have environmental restrictions associated with the material. In addition to the keywords, the NLP analysis can be utilized to associate keywords with certain values and the relationship between the values in the keywords. For example, an environmental regulation may require that a material, such as lead, be in concentrations below a certain percentage or be less than a certain mass within a product or component. The PCD validation engine 402, using a machine learning algorithm/model, can classify these keywords into certain classes, such as environmental classes based on the environmental compliance data. For example, environmental classes can include hazardous or non-hazardous classes. Environmental classes can also include material types, volume restrictions, mass restrictions, weight restrictions, and the like. The PCD validation engine 402 can create feature vectors for materials that include the volume, mass, and/or weight restrictions or any other characteristic of the material as it relates to the environmental regulations including information such as jurisdictions where the environmental compliance is enforced.

In one or more embodiments of the invention, the PCD validation engine 402 can utilize similar NLP techniques for extracting keywords and associated values for the keywords from the historical PCD data. The keywords can include information such as, for example, part number, part type, historical materials data, PCD version information, and the like. Historical materials data can include the material and associated concentrations, amounts, weights, mass, volume, and the like. Also, historical materials data can include material characteristics such as hazardous, non-hazardous, liquid, metal, flammable, and the like.

In one or more embodiments of the invention, the PCD validation engine 402 can receive PCD data 404 as an input and utilizing NLP techniques to parse out data for analysis by the PCD validation engine 402. Keywords can be extracted and compared using a machine learning model to the environmental compliance data and the historical PCD data to determine and output a PCD recommendation and risk score 410. In one or more embodiments of the invention, extracted NLP structures include a translation and/or interpretation of the natural language input, including synonymous variants thereof. The PCD validation engine 402 can analyze the features to determine a context for the features. NLP analysis can be utilized to extract attributes (features) from the natural language. These attributes include, but are not limited to, chemical formulas, material type, material name, manufacturer name, manufacturer location, product type, product use, product location, and the like. These extracted attributes and historical PCD data can be analyzed by the PCD validation engine 402 to determine one or more PCD recommendations and/or risk scores 410 associated with the PCD data. These PCD recommendations and risk scores presented to a user in an output GUI and a user can provide feedback for the recommendation and risk score. The feedback could be written feedback, a feedback rating system, a selection of an icon indicating an acceptance or rejection of the recommendations and risk score, and the like. The user feedback can be fed back through the PCD validation engine 402 to further tune and/or update any machine learning models or algorithms utilized.

In one or more embodiments of the invention, a display can present the recommendations and risk score 410 to a user. The risk score can be a numerical score, such as a range from 0-4 or can be a color-coded score such as red, green, and yellow. The recommendation data presented to the user can be sentences, paragraphs, or individual words that indicate a component to check or a recommendation that explains the associated risk score. The following Table provides a few example recommendations and risk scores. These recommendations and risk scores are for illustrative purposes and are not intended to limit the scope of the recommendations and risk scores.

TABLE 1

Risk Score and Recommendation Output

| Criteria | Definition | Risk Level Matrix (0-4 (High)) |
| --- | --- | --- |
| No Recommendation | Historical data submitted are consistent, | 0 - Although there is regulation updated, the submitted data remained. |
| Recommendation 1 | Historical data submitted are having inconsistency substance weight and/or total weight | 3 - Although submitted substance is the same, there is a discrepancy of declared substance weight >5% and or total weight >10% |
| Recommendation 2 | Only one set of data submitted. | 1 - Only 1 set of data based on product "family series". If the subsequent submitted data remains, there is no risk. |
| Recommendation 3 | Historical data submitted having inconsistent reportable substances. | 3 - Discrepancy of substances are submitted of same family series. |
| Recommendation 4 | No historical data reference due to aged information or "NEW" product family series | 4 - Aged PCD or New product family series are purchased by company which need detail check. |

The first row of Table 1 includes an output of no recommendation based on the historical PCD data submitted and is consistent with the current PCD data 404 despite a new environmental regulation existing. The PCD data 404 for this first row of Table 1 example could have been submitted to the PCD validation engine 402 that would extract features from the PCD data 404 for comparison to historical PCD data to see if this PCD has been analyzed in the past (e.g., PCD historical data exists and a version history). The PCD validation engine 402 can then analyze other versions of the PCD and compare any found to obtain the most recent year version of the PCD. Once the PCD historical data has been obtained, the PCD validation engine 402 can check the PCD characteristics (e.g., weight, mass, volume, and the like) of the current PCD data 404 and determine if any of the PCD characteristics have changed within a certain threshold amount, for example, greater than 5%. If no change in PCD characteristics, a risk score of 0 can be generated and presented with the recommendation of "although there is an updated environmental regulation, the submitted PCD data remains consistent." For "recommendation 1," the PCD validation engine 402 can receive new PCD data and check for historical PCD data. If the PCD historical data exists and is within a certain number of years of version history, the PCD validation engine 402 can check the characteristics of the PCD data 404. If the PCD characteristics exceed a threshold (e.g., weight is higher than 5% of previous weight from historical PCD data), the risk score can be calculated as a 3 rated risk. The recommendation can display the reason for the risk score that the submitted substance is the same but there is discrepancies in weight. This same recommendation can be made if the version history of PCD historical data exceeded a number of years (e.g., greater than 3 but less than 6-year-old version history).

In one or more embodiments, continuing with the Table 1 examples, the "recommendation 2" can be made based on the historical PCD data having only one previous version for the product. In this example, PCD data 404 is received by the PCD validation engine 402 and historical PCD data is obtained from the PCD historical database 406. When a previous PDC version is found with the same PCD number but is below a top level threshold version year but above a secondary threshold version year, the recommendation 2 provides a low risk score (e.g., 1) and a recommendation to check to see whether the PCD data 404 matches the historical PCD data. In one or more embodiments, "recommendation 3" from table 1 can be made by the PCD validation engine 402 when there is conflicting PCD data 404 as compared to PCD historical data version histories. For example, if the same PCD number is associated with multiple instances of historical PCD data with different components and amounts listed. This would result in a higher risk score of "3" and the recommendation explains the high risk being the inconsistent data between the historical PCD data and the current PCD data 404. Also, in embodiments of the invention, "recommendation 4" of Table 1 can be made when the PCD validation engine 402 has no historical PCD data available to compare with the PCD data 404 being presented. This could be the result of a new PCD number or that the previous versions of PCD data are too old to be utilized for comparison based on changes in environmental regulations.

In one or more embodiments of the invention, the product characteristics found in the PCD can be compared to any updates in environmental compliance data to ensure that environmental compliance is met. For example, PCD data for specific components might list a material, such as lead, as being under a certain weight or mass within the component. The PCD validation engine 402 can determine that the component includes a certain amount of lead and compare this data to environmental compliance data to identify some potential issues with the component. If the amount of lead, in this example, exceeds the amount allowable under an environmental rule or regulations, the PCD validation engine 402 could calculate a high-risk score and make a recommendation 410. The recommendation 410 could include a textual message to a user stating that "lead exceeds an environmental threshold." In addition, the lead concentration or amount can be further compared to PCD historical data to see if there is a significant change in material type, concentration, and the like. Any significant change between a historical PCD and current PCD could "flag" the PCD data 404 make a recommendation to further inspect the PCD data and the component as discussed above in Table 1 examples.

Further, additional data can be obtained regarding the component associated with the PCD data 404. For example, based on a recommendation and risk score 410, the PCD validation engine 402 can operate a scale, for example, to obtain the weight of the component associated with the PCD. If there is a significant change in weight without an associated change in the component data 404 as compared to historical PCD data, the PCD validation engine can update the recommendation and risk score 410 based on the change in weight. For example, an increase in weight of a larger component, such as a printed circuit board, could trigger further analysis on the individual components within the printed circuit board such as on board chips, capacitors, etc. to determine the change in weight. The PCD data 404 for each individual component of the circuit board can be analyzed to determine a risk score and recommendation 410 for each component.

In one or more embodiments of the invention, based on the recommendation and risk score 410, the PCD validation engine 402 operate a resource in the client's operations and/or supply chain. For example, if the risk score 410 exceeds a threshold risk score, the PCD validation engine 402 can signal a manufacturing device in a manufacturing facility to utilize a different component with a lower risk score or to cease operations related to the component associated with the high risk score. In another example, if the risk score 410 exceeds the risk score threshold, the PCD validation engine 402 can initiate a change order for supplies from the manufacture or supplier that supplied the component associated with the high risk score. In addition, the recommendation and risk score 410 can cause the PCD validation engine 402 to transmit alerts to a supplier or manufacturer of the component associated with the risk score 410. These alerts can notify the supplier or manufacturer that additional information is required for the component or to notify the supplier or manufacturer of non-compliance with the client's PCD policies or environmental regulations.

Figure 5:
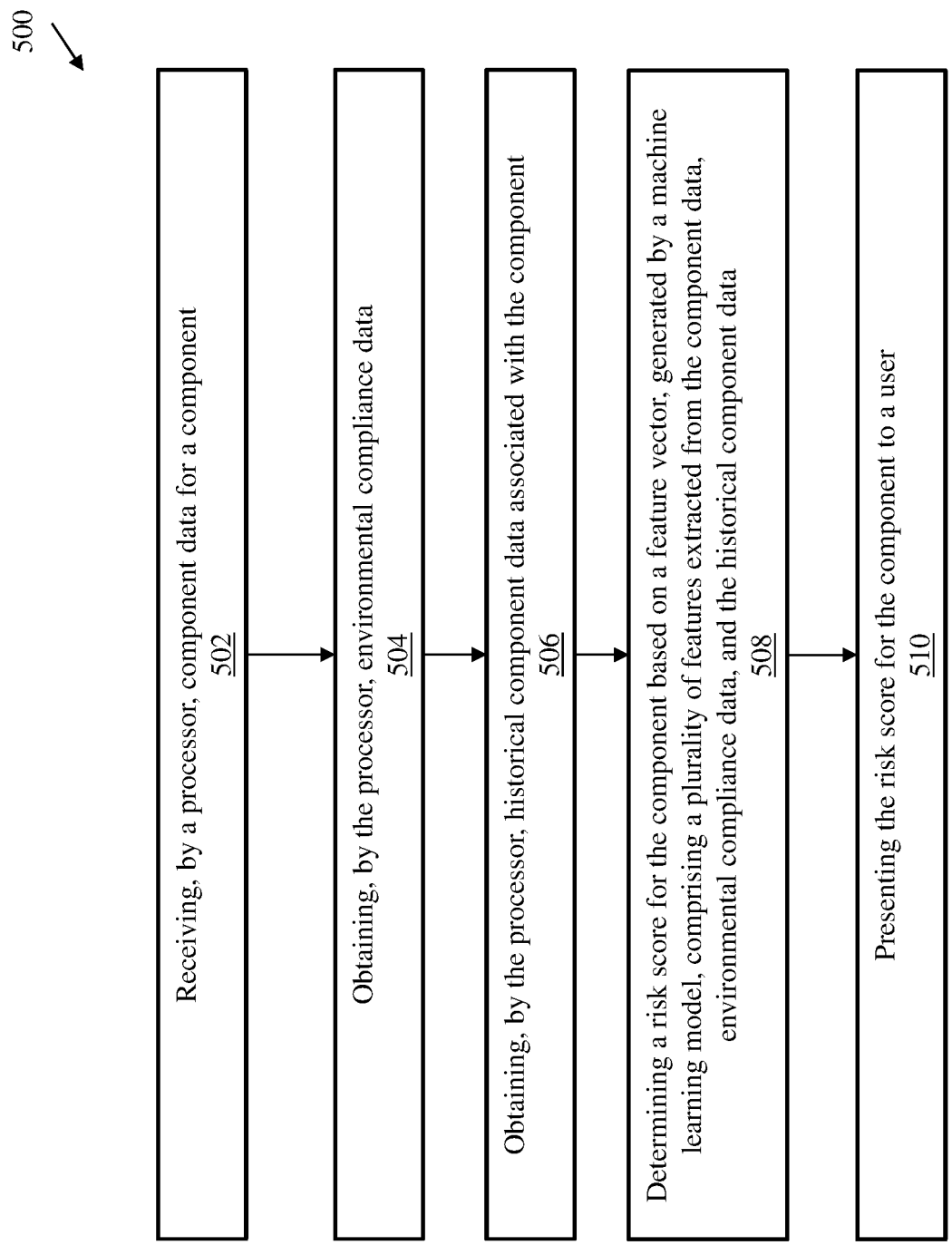
FIG. 5 depicts a flow diagram of a method for component material compliance according to one or more embodiments of the invention.

FIG. 5 depicts a flow diagram of a method for product content validation according to one or more embodiments of the invention. The method 500 includes receiving, by a processor, component data for a component, as shown in block 502. At block 504, the method 500 includes obtaining, by the processor, environmental compliance data. The method 500, at block 506, includes obtaining, by the processor, historical component data associated with the component. At block 508, the method 500 includes determining a risk score for the component based on a feature vector, generated by a machine learning model, comprising a plurality of features extracted from the component data, environmental compliance data, and the historical component data. And at block 510, the method 500 includes presenting the risk score for the component to a user.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for product declaration validation, the method comprising:
   receiving, by a processor, component data for a component;
   analyzing, by the processor executing a natural language processing algorithm, the component data to extract a set of component keywords and an associated keyword value for each component keyword in the set of component keywords;
   obtaining, by the processor, environmental compliance data and extracting a set of environmental compliance keywords associated with the set of component keywords, the set of environmental compliance keywords having an associated environmental compliance keyword value;
   obtaining, by the processor, historical component data associated with the component and extracting a set of historical component keywords associated with the set of component keywords, the set of historical component keywords having an associated historical component keyword value;

determining a risk score for the component based on comparing each associated keyword value with the associated environmental compliance keyword value and the associated historical component keyword value;

presenting the risk score for the component to a user and an associated recommendation based on comparing each associated keyword value with the associated environmental compliance keyword value and the associated historical component keyword value;

comparing the risk score to a threshold risk score; and enacting an action responsive to the risk score exceeding the threshold risk score, wherein the action comprises causing a manufacturing device to cease operations using the component.

2. The computer-implemented method of claim 1, further comprising:

generating one or more recommendations for the component based at least in part on the risk score and a feature vector; and presenting the one or more recommendations for the component to the user.

3. The computer-implemented method of claim 2, further comprising:

receiving an input from the user responsive to presenting the one or more recommendations for the component to the user, wherein the input comprises a selection of at least one of the one or more recommendations for the component;

updating a machine learning model based on the selection.

4. The computer-implemented method of claim 2, further comprising:

receiving an input from the user responsive to presenting the one or more recommendations for the component to the user, wherein the input comprises an indication rejecting at least one of the one or more recommendations for the component;

updating a machine learning model based on the indication.

5. The computer-implemented method of claim 1, wherein a machine learning model is trained, using supervised or unsupervised learning, to classify elements of the environmental compliance data in to a plurality of environmental classes.

6. The computer-implemented method of claim 1, wherein a machine learning model is trained, using supervised or unsupervised learning, to classify elements of the component data in to a plurality of component classes.

7. The computer-implemented method of claim 1, wherein the environmental compliance data comprises regulations associated with one or more materials in the component.

8. A system for product declaration validation, the system comprising:

a processor communicatively coupled to a memory, the processor configured to:

receive component data for a component;

analyze, by executing a natural language processing algorithm, the component data to extract a set of component keywords and an associated keyword value for each component keyword in the set of component keywords;

obtain environmental compliance data and extracting a set of environmental compliance keywords associated with the set of component keywords, the set of environmental compliance keywords having an associated environmental compliance keyword value;

obtain historical component data associated with the component and extracting a set of historical component keywords associated with the set of component keywords, the set of historical component keywords having an associated historical component keyword value;

determine a risk score for the component based on comparing each associated keyword value with the associated environmental compliance keyword value and the associated historical component keyword value;

present the risk score for the component to a user and an associated recommendation based on comparing each associated keyword value with the associated environmental compliance keyword value and the associated historical component keyword value;

compare the risk score to a threshold risk score; and enact an action responsive to the risk score exceeding the threshold risk score, wherein the action comprises causing a manufacturing device to cease operations using the component.

9. The system of claim 8, wherein the processor is further configured to:

generate one or more recommendations for the component based at least in part on the risk score and a feature vector; and present the one or more recommendations for the component to the user.

10. The system of claim 9, wherein the processor is further configured to:

receive an input from the user responsive to presenting the one or more recommendations for the component to the user, wherein the input comprises a selection of at least one of the one or more recommendations for the component;

update a machine learning model based on the selection.

11. The system of claim 9, wherein the processor is further configured to:

receive an input from the user responsive to presenting the one or more recommendations for the component to the user, wherein the input comprises an indication rejecting at least one of the one or more recommendations for the component;

update a machine learning model based on the indication.

12. The system of claim 8, wherein a machine learning model is trained, using supervised or unsupervised learning, to classify elements of the environmental compliance data in to a plurality of environmental classes.

13. The system of claim 8, wherein a machine learning model is trained, using supervised or unsupervised learning, to classify elements of the component data in to a plurality of component classes.

14. A computer program product for product content validation, the computer program product comprising a computer readable storage medium having program instructions embodied therewith, wherein the computer readable storage medium is not a transitory signal per se, the program instructions executable by a processor to cause the processor to perform a method comprising:

receiving, by the processor, component data for a component;

analyzing, by the processor executing a natural language processing algorithm, the component data to extract a set of component keywords and an associated keyword value for each component keyword in the set of component keywords;

obtaining, by the processor, environmental compliance data and extracting a set of environmental compliance keywords associated with the set of component keywords, the set of environmental compliance keywords having an associated environmental compliance keyword value;

obtaining, by the processor, historical component data associated with the component and extracting a set of historical component keywords associated with the set of component keywords, the set of historical component keywords having an associated historical component keyword value;

determining a risk score for the component based on comparing each associated keyword value with the associated environmental compliance keyword value and the associated historical component keyword value;

presenting the risk score for the component to a user and an associated recommendation based on comparing each associated keyword value with the associated environmental compliance keyword value and the associated historical component keyword value;

comparing the risk score to a threshold risk score; and enacting an action responsive to the risk score exceeding the threshold risk score, wherein the action comprises causing a manufacturing device to cease operations using the component.

15. The computer program product of claim 14, further comprising:

generating one or more recommendations for the component based at least in part on the risk score and a feature vector; and presenting the one or more recommendations for the component to the user.

16. The computer program product of claim 15, further comprising:

receiving an input from the user responsive to presenting the one or more recommendations for the component to the user, wherein the input comprises a selection of at least one of the one or more recommendations for the component;

updating a machine learning model based on the selection.

17. The computer program product of claim 15, further comprising:

receiving an input from the user responsive to presenting the one or more recommendations for the component to the user, wherein the input comprises an indication rejecting at least one of the one or more recommendations for the component;

updating a machine learning model based on the indication.

18. The computer program product of claim 14, wherein a machine learning model is trained, using supervised or unsupervised learning, to classify elements of the environmental compliance data in to a plurality of environmental classes.

19. The computer program product of claim 14, wherein a machine learning model is trained, using supervised or unsupervised learning, to classify elements of the component data in to a plurality of component classes.

20. The computer program product of claim 14, wherein the environmental compliance data comprises regulations associated with one or more materials in the component.

* * * * *